V. R. KOONTZ.
CUTTER HEAD.
APPLICATION FILED DEC. 26, 1912.
1,072,127.
Patented Sept. 2, 1913.
3 SHEETS—SHEET 2.
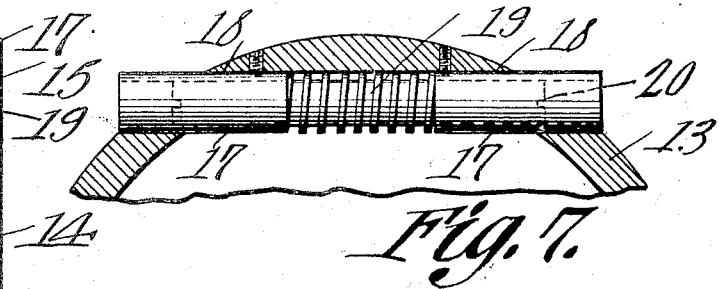
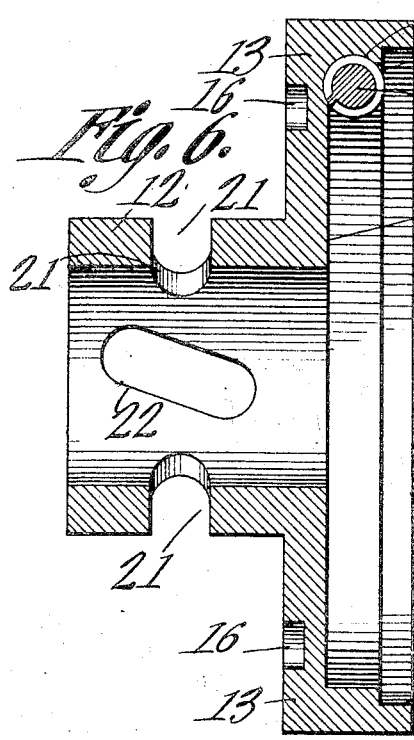
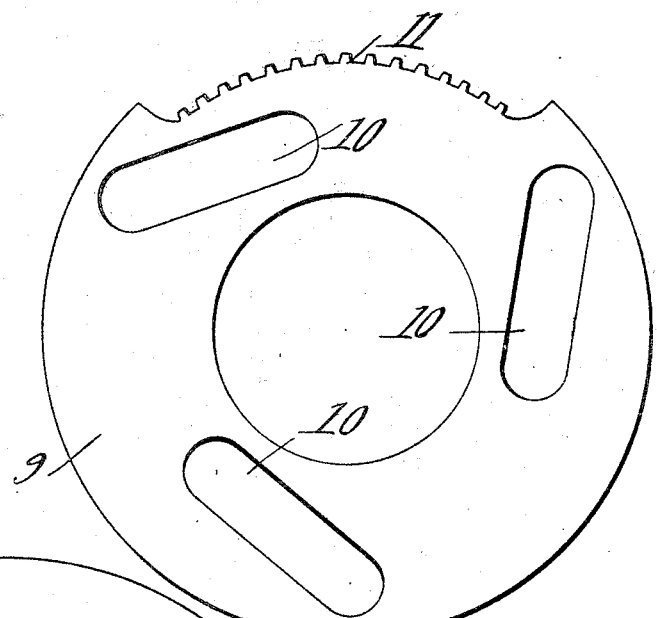
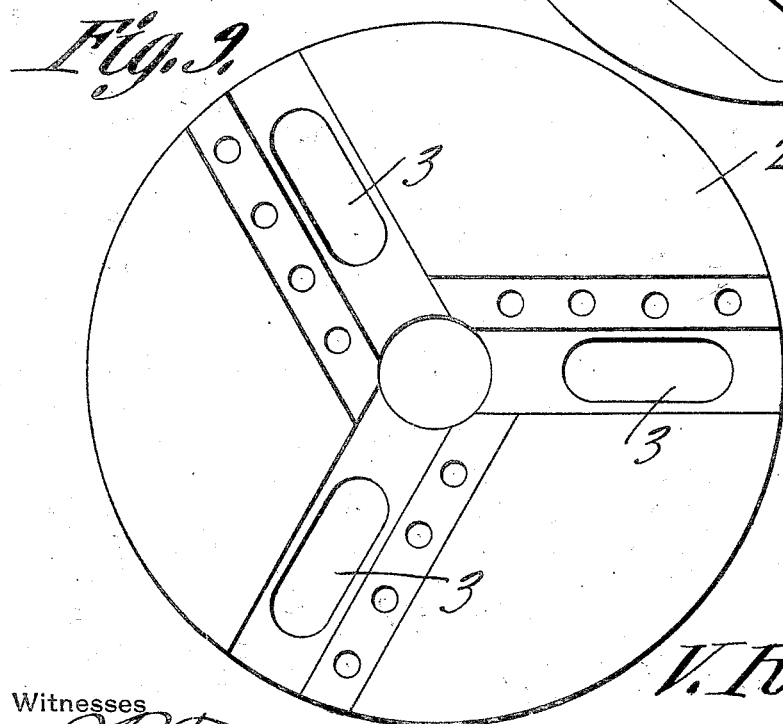
V. R. Koontz,
Inventor
by C. A. Snow & Co.
Attorneys
Witnesses

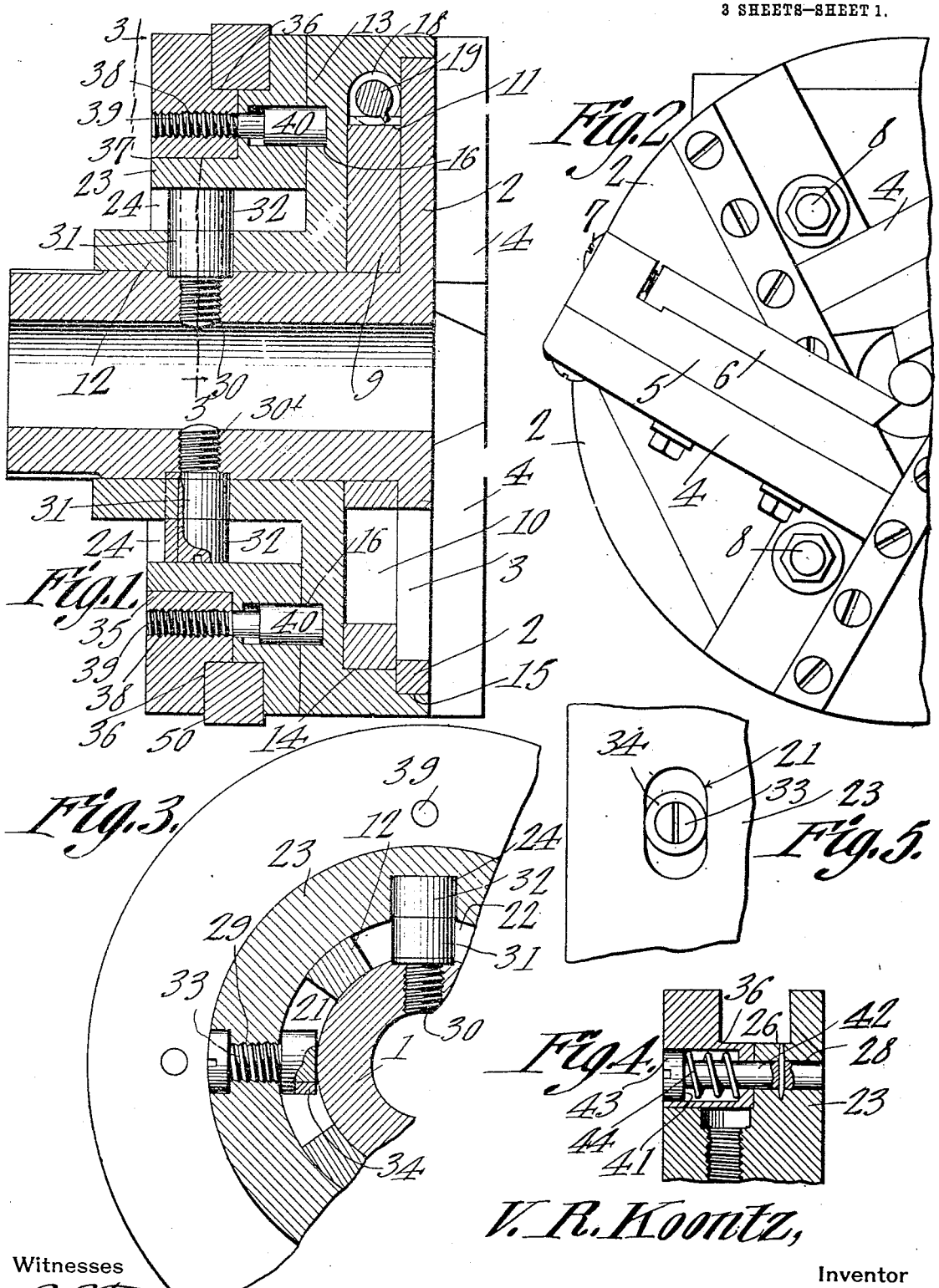

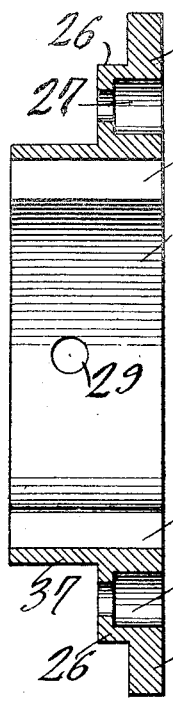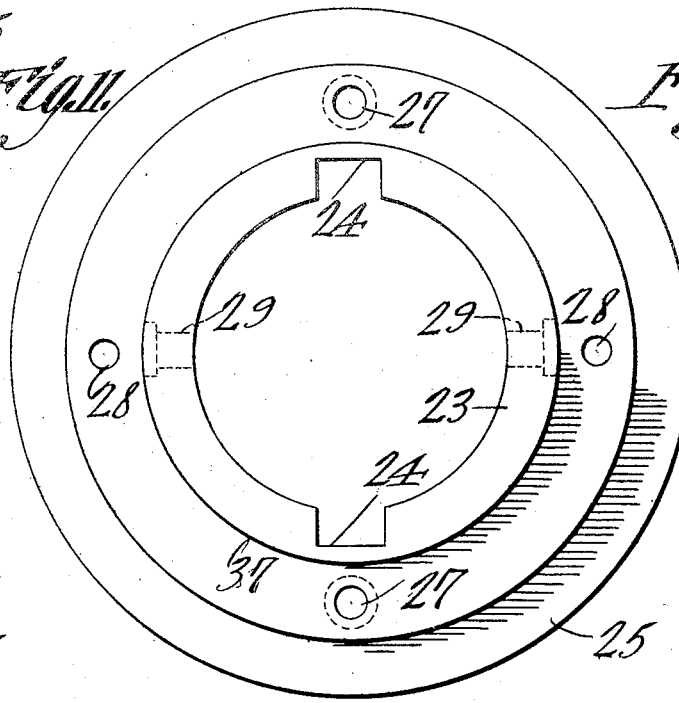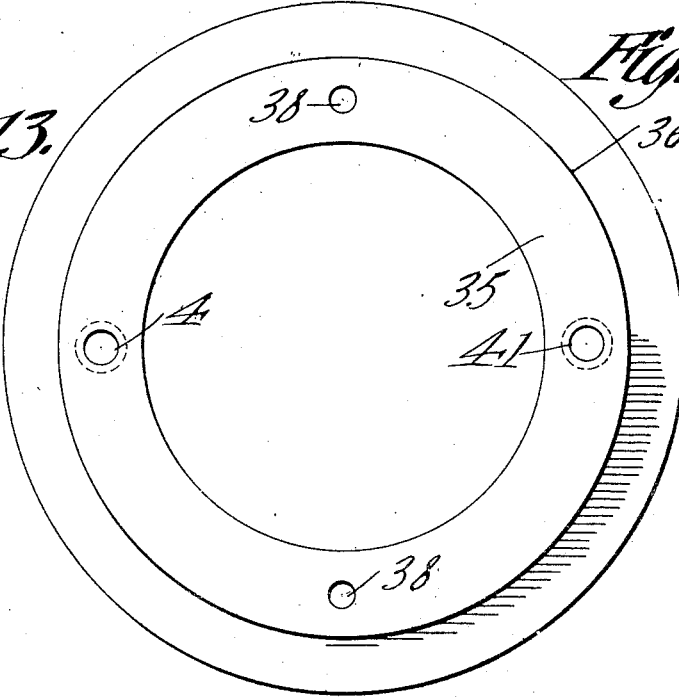

UNITED STATES PATENT OFFICE.

VICTOR R. KOONTZ, OF WAYNESBORO, PENNSYLVANIA.

CUTTER-HEAD.

1,072,127.  Specification of Letters Patent.  Patented Sept. 2, 1913.

Application filed December 26, 1912. Serial No. 738,698.

*To all whom it may concern:*

Be it known that I, VICTOR R. KOONTZ, a citizen of the United States, residing at Waynesboro, in the county of Franklin and State of Pennsylvania, have invented a new and useful Cutter-Head, of which the following is a specification.

The present invention relates to improvements in cutter heads, the primary object of the present invention being the provision of a novel form of cutter head, in which the tools or dies have their cutting edges disposed tangentially to the bore of the spindle and are movable to and from position by means of a novel form of mechanism manually controllable, said mechanism being a two-part mechanism one of which parts actuates a locking means to retain the same in locked position when the tools or dies are in and out of work engaging position while the other retains mechanisms for locking the parts rigidly when the tools or dies are in work engaging position and for moving the tools into and out of such position.

A further object of the present invention is a cutter head provided with a novel form of yoke actuated device, which is composed of two annular members, one of which members is initially moved in a longitudinal direction before the other member is moved in such direction and finally oscillated to produce the desired effect in retracting the tools or dies from work engaging position and holding the same in such retracted position or vice versa.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a diametrical section through the complete head with the parts in locked position. Fig. 2 is a front elevation of a portion of the cutter head showing the tools or dies in proper relative position. Fig. 3 is a section taken on line 3—3 of Fig. 1. Fig. 4 is a cross section through the two rings for actuating the tools showing the locking pin therebetween. Fig. 5 is a detail elevation of a portion of the tool actuating member showing the connection thereof to the spindle and permitting a rotary movement to the tool or die actuating member. Fig. 6 is a cross section taken through the tool or die actuating member *per se*. Fig. 7 is a view illustrating the portion of the same carrying the means for adjusting the tool or die actuating disk. Fig. 8 is a plan view of the tool or die actuating disk. Fig. 9 is an elevation of the tool or die carrying disk. Figs. 10 and 11 are detail views of the main oscillatory ring. Figs. 12 and 13 are similar views of the coacting ring thereof.

Referring to the drawings, the numeral 1 designates the spindle which is adapted to be connected to a lathe, the same being hollow as is the usual custom and carrying the tool or die holder carrying plate or disk 2, which is provided with the three radially disposed slots 3 as clearly shown in Fig. 9. This disk is provided with means for carrying the tool or die holders 4, which are connected as shown by means of bolts 8 for movement to and from the center of the plate or disk 2, said bolts or screws 8 as will presently appear being projected into the respective tangentially disposed slots 10 of the die holder adjusting and control ring or disk 9 which is mounted for oscillation around the spindle 1 at the rear of the plate 2, as clearly shown in Fig. 1. In order to provide a means for adjusting the controlling disk 9, a portion of the periphery as at 11 is cut away and provided with gear teeth, the operation and control of which will be set forth later on.

Mounted for oscillatory movement upon the spindle 1 to the rear of the disk 9 is a sleeve 12 which is provided with the integral socketed plate or flange 13, which as clearly shown in Figs. 1 and 6 is provided with the double diametered portions 14 and 15 to accommodate the plate 2 and the disk 9.

In the rear face of the plate 13 of the sleeve 12 is provided the diametrically disposed sockets 16 which constitute a portion of a locking device, as will presently appear. Mounted in the respective apertures or slots 18 formed through the body of the disk 13 and securely fastened therein are the two sleeves 17, in which is fitted for rotation the smooth or cylindrical ends of the screw 19, said screw 19 being provided with the slotted portions 20 for the introduction thereto of a screw driver to permit of the rotation of the screw 19, which is in mesh with the gear 11, thus forming a worm gearing to permit of the proper oscillation of the disk 9 to adjust the slots 10 relatively to the tool operating bolts 8. By this means the relative cut of the tool is adjusted.

The sleeve 12 as clearly shown, is provided with the diametrically disposed slot 21, while cut circumferentially thereof, are the inclined slots 22, which are at an angle of 90° to the slots 21 and are cut at an angle to the axis of the sleeve 12.

Mounted for oscillation upon the sleeve 12 to the rear of the disk 13 thereof, is the main carrying disk or ring 23, as clearly shown in detail in Figs. 10 and 11, the same, as therein shown, being provided with the diametrically disposed radial slots 24, and the peripheral rim 25 provided with the yoke receiving recess 26, the purpose of which will presently appear. In the face of the rim 25 is provided the two diametrically disposed double diametered sockets or apertures 27, and the single diametered apertures 28, all as clearly shown in Fig. 10. Formed in the sleeve portion 37 thereof at diametrically opposite points to each other and at angles of 90° to the respective slots 24 are the double diametered apertures 29, the purpose of which will presently appear.

In order to cause the ring 23 to rotate with the sleeve 12 and also with the spindle 1, the two pins 30 are threaded into the spindle 1, as clearly shown in Figs. 1 and 3, and they project through the respective slots 22 of the sleeve 12 and into the recesses 24 of the sleeve 23, there being positioned upon each of the respective pins 30, the two anti-frictional rollers 31 and 32, the roller 31 being disposed in its respective slot 22 of the sleeve 12 while the roller 32 is disposed in its respective slot 24 of the sleeve 23, thus at these points reducing the friction and providing an anti-frictional connection between the various elements. Mounted for longitudinal sliding movement upon the reduced portion 37 of the member 23, is a co-acting ring 35, which is provided with the circumferential yoke receiving recess 36, which is disposed when the members are in proper position as clearly shown in Fig. 1, to assume the position as therein shown and receive the yoke 50, which is manually controllable for separating the ring 35 from the ring 23, and for controlling the actuation of the tools 6, as will presently appear.

In order to provide a means for locking the ring 35 and the ring 23 for movement circumferentially in unison, the ring 35 is provided with the diametrically disposed threaded apertures 38 for the reception of the threaded ends 39 of the cylindrical pins 40, the cylindrical ends being enlarged and disposed for sliding movement within the double diametered slots or apertures 27 of the disk 25 and for projection therebeyond, when the parts are in the position as shown in Fig. 1, into the locking sockets or recesses 16 of the disk or flange 13.

Additional means for locking and automatically moving the rings 35 and 23 together consists of the sockets 41 provided at diametrically opposite points in the rear face of the ring 35, and as clearly shown in Fig. 4, said sockets being disposed, as shown in Fig. 12, at angles of 90° to the apertures 38 and having disposed for sliding movement therein, the pins 42 whose heads 43 are mounted in the sockets 41 similarly to a plunger, a spring 44 being disposed upon each pin 42, as clearly shown in Fig. 4, to normally maintain the said pin 42 in the necessary position to draw the ring 35 upon the shouldered portion 37 of the ring 23, the end of the pin 42 within the aperture 28 of the ring 23 being secured rigidly therein so that when the member or ring 35 is initially operated to be slid outwardly and longitudinally from the ring 23, the spring 44 will be compressed and will automatically return the ring 35 into the position as shown in Figs. 1 and 4.

From the foregoing description, taken in connection with the drawings it is evident that the tool or die holders 4 carrying the tools or dies 6 may be readily adjusted relatively to each other and the work projecting through the spindle 1, by means of the worm gearing 19 and 11, and that by reason of the two rings 23 and 35, and their operating mechanism, the respective disks 13 and 9 will be actuated to cause the retraction or projection of the die holders 4 which may, as before described and set forth, be locked either in a retracted or projected position, due to the position of the respective locking pins 40 with relation to the flanged disk 13.

As shown in Fig. 1, the parts are in locked position with the tools or dies 6 placed in work engaging position. Assuming that it is desirable to retract the tools or dies 6 and their holders 4, the yoke 50 is operated by being moved slightly to the left as viewed in Fig. 1 and as the ring 35 is permitted a slight longitudinal movement, the same will move to the left until the headed pins 40 are moved out of the recesses 16 of the flange 13, at which time the rings 23 and 35 will be disengaged from the flange ring 13. A continued movement of the yoke 50 will cause the ring 23 to be moved longitudinally, riding upon the anti-frictional rollers 32 of the pins 30, which due to the rotation of the spindle will impart a slight oscillatory movement to the flange 13 and consequently the tool or die adjusting and actuating disk 9 whose peculiar shaped slots 10 will now be brought into play to engage the bolts 8 and cause the die holders 4 to move outwardly and carry the tools or dies out of engagement with the work. The movement of the yoke 50 in the opposite direction will permit of the projection of the tools or dies 6 into work engaging position and finally when the projected pins 40 are placed in registration with the sockets 16 of the flange 13, the flange 13 will be locked for rotation and against movement as before described.

What is claimed is:

1. A cutter head, including a spindle receiving member having a die holder carrying disk at one end, a plurality of die-holders mounted for sliding movement in the outer face of the disk, an oscillatory sleeve having an annular flange surrounding the spindle receiving member, the flange thereof being provided with a socket in one face to receive the die holder carrying disk, coacting means carried by the flange and the die-holders, to slide the die-holders as the sleeve is oscillated independently of the spindle receiving member, and longitudinally slidable and oscillatory means for locking and releasing the flange in die holder projecting and retracting positions and for actuating the flange to retract and project the die holders.

2. A cutter head, including a spindle receiving member having a die holder carrying disk at one end, a plurality of die-holders mounted for sliding movement in the outer face of the disk, an oscillatory sleeve having an annular flange surrounding the spindle receiving member, the flange thereof being provided with a double diametered socket in one face to receive the die holder carrying disk, a disk mounted in the reduced portion of the socket and connected to the flange, coacting means carried by the socket and the die-holders to slide the die-holders as the sleeve is oscillated independently of the spindle receiving member, and longitudinally slidable and oscillatory means for locking and releasing the flange in die holder projecting and retracting positions and for actuating the flange to retract and project the die-holders.

3. A cutter head, including a spindle receiving member having a die holder carrying disk at one end, a plurality of die-holders mounted for sliding movement in the outer face of the disk, an oscillatory sleeve having an annular flange surrounding the spindle receiving member, the flange thereof being provided with a socket in one face to receive the die holder carrying disk, coacting means carried by the flange and the die-holders to slide the die-holders as the sleeve is oscillated independently of the spindle receiving member, longitudinally slidable and oscillatory means for locking and releasing the flange in die holder projecting and retracting positions and for actuating the flange to retract and project the die-holders, and a manually controlled yoke for operating the last means.

4. A cutter head, including a spindle receiving member having a die holder carrying disk at one end, a plurality of die-holders mounted for sliding movement in the outer face of the disk, an oscillatory sleeve having an annular flange surrounding the spindle receiving member, the flange thereof being provided with a double diametered socket in one face to receive the die holder carrying disk, a disk mounted in the reduced portion of the socket and connected to the flange, coacting means carried by the disk and the die-holders to slide the die-holders as the sleeve is oscillated independently of the spindle receiving member, longitudinally slidable and oscillatory means for locking and releasing the flange in die holder projecting and retracting positions and for actuating the flange to retract and project the die-holders, and a manually controlled yoke for operating the last means.

5. A cutting head, including a spindle receiving sleeve having a die holder carrying disk at one end, a plurality of die-holders mounted for radial sliding movement in the disk, an oscillatory sleeve surrounding the first sleeve and having a flange upon one end provided with a socket to receive the die holder carrying disk, a disk disposed in the socket to the rear of the die holder carrying disk and connected to the oscillatory flange, coöperable means carried by the die-holders and the last disk to cause the projection and retraction of the die-holders as the oscillatory sleeve is oscillated, and a ring forming a means to oscillate the sleeve for locking and releasing the sleeve.

6. A cutter head, including a spindle receiving sleeve having a die holder carrying disk at one end, a plurality of die-holders mounted for radial sliding movements in the disk, an oscillatory sleeve surrounding the first sleeve and having a flange upon one end provided with a socket to receive the die holder carrying disk, a disk disposed in the socket to the rear of the die holder carrying disk, and connected to the oscillatory flange, coöperable means carried by the die-holders and the last disk to cause the projection and retraction of the die-holders as the oscillatory sleeve is oscillated, a two membered ring forming means to oscillate the sleeve for locking and releasing the sleeve, and a single means for initially operating one member of the ring to release the oscillatory sleeve and finally the second member to permit the oscillation of the sleeve independently of the ring.

7. A cutter head, including a spindle receiving sleeve having a die holder carrying disk at one end, a plurality of die-holders mounted for radial sliding movements in the disk, an oscillatory sleeve surrounding the first sleeve and having a flange upon one end provided with a socket to receive the die holder carrying disk, a disk disposed in the socket to the rear of the die holder carrying disk, means for adjustably connecting the second disk to the oscillatory flange, coöperable means carried by the die-holders and the last disk, to cause the projection and retraction of the die-holders as the sleeve is oscillated, and a sliding and an oscillatory ring forming means to oscillate the sleeve and for locking and releasing the sleeve.

In testimony that I claim the foregoing as my own, I have hereto affixed my signature in the presence of two witnesses.

VICTOR R. KOONTZ.

Witnesses:
CHAS. E. WOLFF,
H. C. GEIST.